United States Patent
Choi et al.

(10) Patent No.: US 7,766,036 B2
(45) Date of Patent: Aug. 3, 2010

(54) DISCHARGE VALVE AND VALVE ASSEMBLY OF RECIPROCATING COMPRESSOR HAVING THE SAME

(75) Inventors: Jong-Yoon Choi, Gyeongsangnam-Do (KR); Sang-Wook Ahn, Gyeongsangnam-Do (KR); Bon-Cheol Ku, Gyeongsangnam-Do (KR); Hyung-Pyo Yoon, Gyeongsangnam-Do (KR); Hyo-Jae Lee, Gyeongsangnam-Do (KR); Seong-Yeol Hyeon, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 11/667,584

(22) PCT Filed: Nov. 11, 2005

(86) PCT No.: PCT/KR2005/003841

§ 371 (c)(1),
(2), (4) Date: May 11, 2007

(87) PCT Pub. No.: WO2006/052110

PCT Pub. Date: May 18, 2006

(65) Prior Publication Data

US 2007/0295410 A1    Dec. 27, 2007

(30) Foreign Application Priority Data

Nov. 12, 2004 (KR) ............... 10-2004-0092649
Jan. 27, 2005 (KR) ............... 10-2005-0007560
Jan. 27, 2005 (KR) ............... 10-2005-0007569

(51) Int. Cl.
*F16K 15/02* (2006.01)

(52) U.S. Cl. ............. 137/543.17; 137/540; 137/543.13; 251/337

(58) Field of Classification Search ............... 137/540, 137/543.17, 516.11, 516.13, 543.13, 543.19, 137/543.21; 251/336, 337
See application file for complete search history.

(56) References Cited

U.S. PATENT DOCUMENTS

| 466,838 | A | * | 1/1892 | Shaddick | 137/543.21 |
|---|---|---|---|---|---|
| 1,044,300 | A | * | 11/1912 | Tryon | 137/543.19 |
| 1,222,154 | A | * | 4/1917 | Smolensky | 137/332 |
| 1,625,367 | A | * | 4/1927 | Kennon et al. | 137/540 |
| 1,800,185 | A | * | 4/1931 | Thrush | 137/543.17 |
| 2,069,309 | A | * | 2/1937 | Henszey | 73/861.54 |
| 2,521,961 | A | * | 9/1950 | Flavius | 222/321.9 |

(Continued)

FOREIGN PATENT DOCUMENTS

DE    3504092    8/1985

(Continued)

*Primary Examiner*—John Rivell
*Assistant Examiner*—William McCalister
(74) *Attorney, Agent, or Firm*—McKenna Long & Aldridge LLP (57) ABSTRACT

A discharge valve (100) of a compressor is disclosed. The discharge valve (100) contains a spring-loaded valve body (120). Valve body (120) is preferably made of nonferrous metal like aluminum or magnesium and is coated by a covering (110) of uniform thickness, the covering (110) being preferably made of plastic material like polyetheretherketone (PEEK) by insertion molding. By that way a wear resistant and light-weight discharge valve is produced.

4 Claims, 6 Drawing Sheets

U.S. PATENT DOCUMENTS

| | | | |
|---|---|---|---|
| 2,590,686 A * | 3/1952 | Coffey | 137/331 |
| 2,673,062 A * | 3/1954 | Cornelius | 137/540 |
| 3,289,693 A | 12/1966 | Scaramucci | |
| 3,292,658 A | 12/1966 | Scaramucci | |
| 3,462,994 A * | 8/1969 | Maust | 137/557 |
| 3,586,047 A * | 6/1971 | Ehrenberg | 137/614.04 |
| 3,911,950 A * | 10/1975 | Lowe et al. | 137/543.17 |
| 4,936,327 A * | 6/1990 | Baumann | 137/543.19 |
| 5,183,075 A * | 2/1993 | Stein | 137/493.6 |
| 5,349,984 A * | 9/1994 | Weinheimer et al. | 137/543.21 |
| 5,495,865 A * | 3/1996 | Wass et al. | 137/68.3 |
| 5,704,394 A | 1/1998 | Hahn et al. | |
| 6,024,126 A * | 2/2000 | Miller et al. | 137/854 |
| 6,026,848 A * | 2/2000 | Huynh | 137/493.9 |
| 6,220,299 B1 * | 4/2001 | Arvidsson et al. | 137/863 |
| 7,056,106 B2 * | 6/2006 | Lee et al. | 417/570 |
| 7,096,884 B2 * | 8/2006 | Mackal | 137/543.23 |
| 2002/0150488 A1 * | 10/2002 | Lee et al. | 417/569 |
| 2005/0115616 A1 * | 6/2005 | Mackal | 137/540 |

FOREIGN PATENT DOCUMENTS

| | | |
|---|---|---|
| DE | 4342577 | 6/1995 |
| EP | 1251279 | 10/2002 |
| EP | 1259749 | 11/2002 |
| FR | 1240707 | 8/1960 |
| FR | 2844838 | 3/2004 |
| GB | 1221001 | 2/1971 |
| GB | 1-500-391 | 2/1978 |
| GB | 1500391 | 2/1978 |
| JP | 52-170726 | 12/1977 |
| JP | 57-085661 | 5/1982 |
| JP | 61-179463 | 8/1986 |
| JP | 62-73169 | 11/1987 |
| JP | 11-303732 | 11/1998 |
| JP | 11-082772 | 3/1999 |
| JP | 11-257223 | 9/1999 |
| JP | 2000-192885 | 7/2000 |
| JP | 2000-346497 | 12/2000 |
| JP | 2002-039070 | 2/2002 |
| JP | 2004-108271 | 4/2004 |
| JP | 2004-108272 | 4/2004 |

* cited by examiner

| # DISCHARGE VALVE AND VALVE ASSEMBLY OF RECIPROCATING COMPRESSOR HAVING THE SAME

This application claims the benefit of Korean Application No. 2004-0092649, filed on Nov. 12, 2004, Korean Application No. 2005-0007569, filed on Jan. 27, 2005 and Korean Application No. 2005-007560 filed on Jan. 27, 2005, and PCT application No. PCT/KR2005/003841, filed on Nov. 11, 2005 which are hereby incorporated by reference as if fully set forth herein.

TECHNICAL FIELD

The present invention relates to a valve assembly of a reciprocating compressor, and particularly, to a discharge valve and a discharge valve assembly of a reciprocating compressor having the same capable of increasing structural strength of a valve, reducing a weight of the valve and reducing a manufacturing cost of the valve.

BACKGROUND ART

A compressor compresses a gas by converting electric energy into kinetic energy. According to a compression mechanism compressing a gas, there are various types of compressors such as a rotary compressor, a scroll compressor, a reciprocal compressor and the like.

As for the reciprocating compressor, when a driving motor generates a driving force, a piston constituting a compression unit linearly reciprocates within a cylinder upon receiving the driving force, thereby drawing in, compressing and discharging a gas. There are a method in which a driving motor generates a rotating force and the rotating force is transferred to a piston through a crank shaft and a method in which the driving motor generates a linear reciprocating driving force and the linear reciprocating driving force is transferred to the piston.

In the reciprocating compressor, when the piston linearly reciprocates within a cylinder upon receiving a driving force of the driving motor, an intake valve and a discharge valve are opened and closed by a pressure difference inside the cylinder according to the reciprocation of the piston, and thusly a gas is taken into the cylinder, compressed and discharged.

Figure 1:
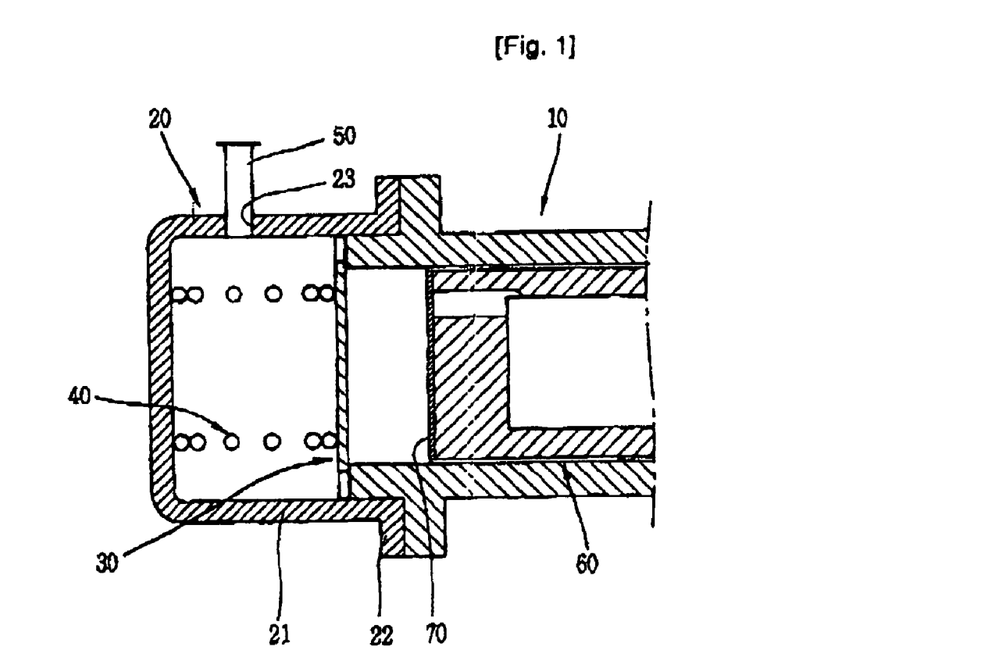
FIG. 1 is a sectional view which illustrates a discharge valve assembly of a general reciprocating compressor.

FIG. 1 is a sectional view that illustrates one example of a discharge valve assembly of a reciprocating compressor.

As illustrated, the discharge valve assembly of the reciprocating compressor includes a discharge cover 20 covering an inner space of the cylinder 10, a discharge valve 30 inserted in the discharge cover 20 and opening and closing the inner space of the cylinder 10, and a valve spring 40 elastically supporting the discharge valve 30.

The discharge cover 20 includes a cylindrical portion 21 having certain length and outer diameter and having a space therein, a fixing portion 22 bent and extending from one side of the cylindrical portion 21 and coupled to a front frame (not shown), and a discharge hole 23 formed at the cylindrical portion 21 and coupled to a gas discharge pipe 50 through which a gas is discharged.

The discharge valve 30 has a disc shape with a certain thickness, and the valve spring 40 is a cylindrical coil spring having a certain length.

Undescribed reference numeral 60 is a piston and 70 is a suction valve:

The operation of the discharge valve assembly of such a reciprocating compressor will now be described.

Figure 2:
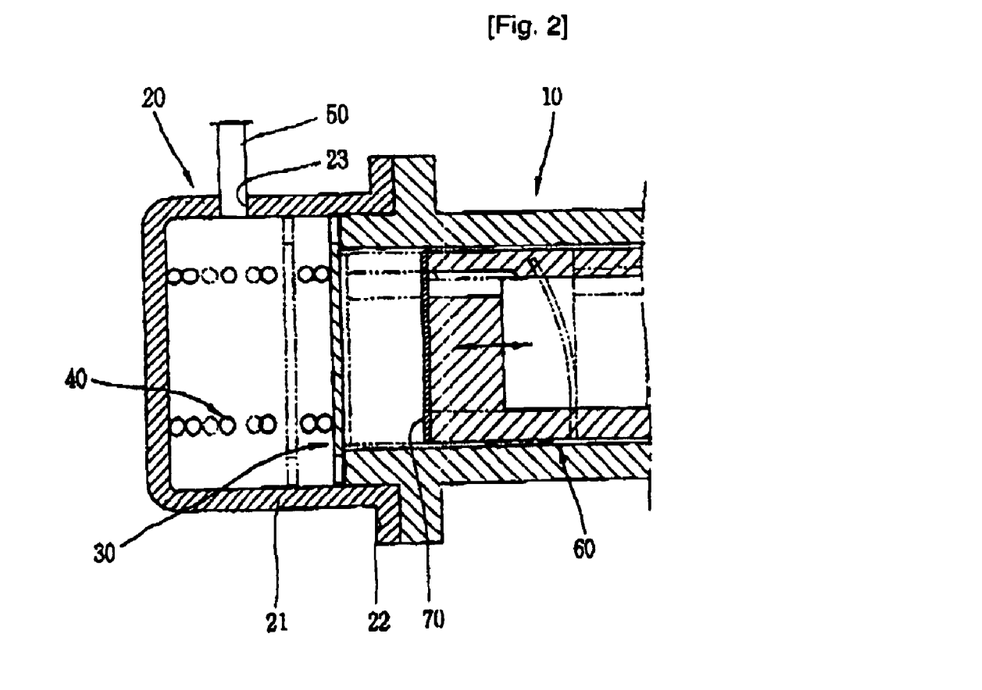
FIG. 2 is a sectional view which illustrates an operational state of the discharge valve assembly of the reciprocating compressor.

The piston 60 linearly reciprocates upon receiving a driving force of the driving motor (not shown). First, when the piston 60 moves from a top dead point to a bottom dead point, as shown in FIG. 2, the discharge valve 30 is closely attached to a contact surface of the cylinder 10 by a pressure difference inside the cylinder and simultaneously, the suction valve 70 is opened so as to allow the introduction of a gas into the inner space of the cylinder through a flow path formed in the piston 60.

If the piston 60 moves from the bottom dead point to the top dead point, the suction valve 70 blocks the flow path of the piston 60, thereby gradually compressing a gas received in the inner space of the cylinder 10. Then, the gas reaches a set compression state, the discharge valve 30 supported by the valve spring 40 is opened, discharging the compressed gas. Such processes are continuously repeated, to thereby compress a gas.

In the aforementioned discharge valve assembly, the discharge valve 30 that opens and closes an inner space of the cylinder 10 and discharges a gas continuously comes in contact with a contact surface of the cylinder 10 and also is influenced by high pressure at the time of introduction and discharge of the gas. If the discharge valve 30 is deformed or abraded by the pressure applied to the discharge valve 30 and the impact due to continuous contact with the contact surface of the cylinder 10, the leakage of a gas occurs and the compression efficiency is degraded. Accordingly, those issues must be considered in designing the discharge valve 30.

If a volume of the discharge valve 30 is increased or a material having great strength is used for the discharge valve 30 in order to prevent deformation of the discharge valve 30 due to the pressure applied thereto, the amount of impact occurring when the discharge valve 30 continuously comes in contact with the contact surface of the cylinder 10 is increased, which causes contact noise and damage to the discharge valve 30.

DISCLOSURE OF THE INVENTION

Therefore, an object of the present invention is to provide a discharge valve and a discharge valve assembly of a reciprocating compressor having the same capable of improving structural strength of a valve and reducing a weight of the valve.

Another object of the present invention is to provide a discharge valve and a discharge valve assembly of a reciprocating compressor having the same capable of reducing a manufacturing cost of the valve.

To achieve these and other advantages and in accordance with the purpose of the present invention, as embodied and broadly described herein, there is provided a discharge valve comprising a cover coming in contact with a cylinder so as to open and close an inner space of the cylinder, and a valve body formed as one body with the cover and formed of a material difference from that of the cover.

To achieve these and other advantages and in accordance with the purpose of the present invention, as embodied and broadly described herein, there is also provided a discharge valve assembly of a reciprocating compressor comprising: a discharge cover covering an inner space of a cylinder; a discharge valve including a plastic cover coming in contact with the cylinder and a valve body formed as one body with the plastic cover and formed of ferrous metal, and opening and closing an inner space of the cylinder as its cover comes in contact with the cylinder; and a spring placed between an inner surface of the discharge cover and the discharge valve and elastically supporting the discharge valve.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

Reference will now be made in detail to the preferred embodiments of the present invention, examples of which are illustrated in the accompanying drawings.

Figure 3:
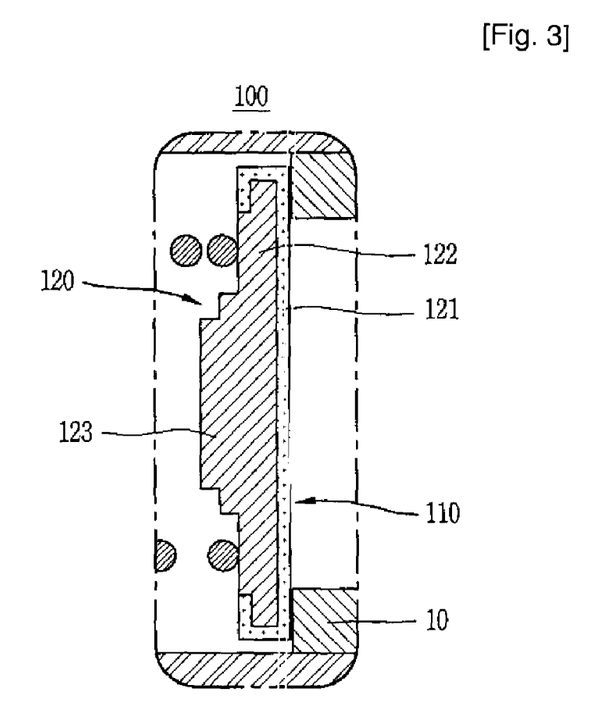
FIGS. 3 and 4 are a sectional view and a perspective view that illustrate a discharge valve in accordance with a first embodiment of the present invention.
Figure 4:
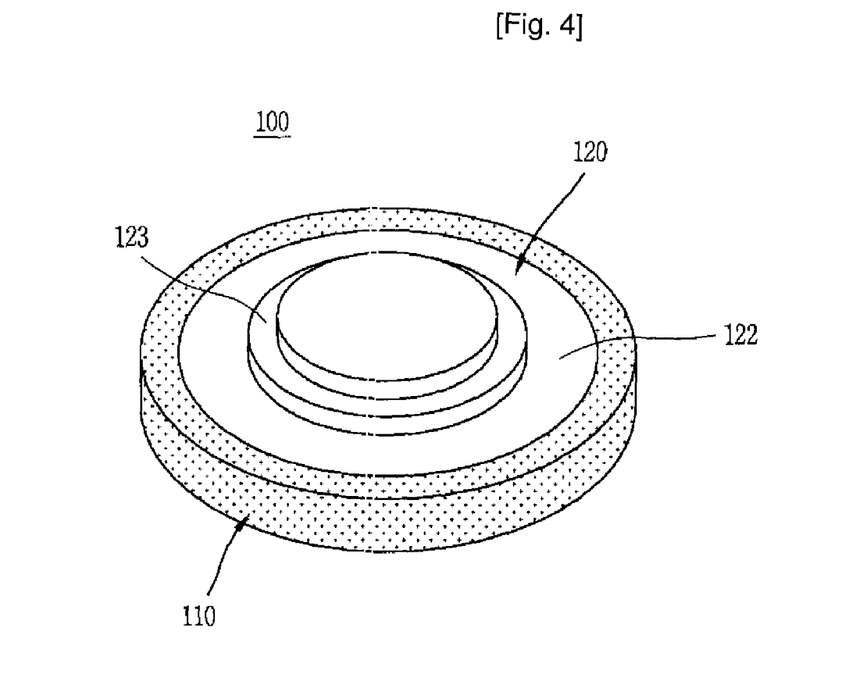

FIG. 3 is a sectional view that illustrates a discharge valve in accordance with a first embodiment of the present invention, and FIG. 4 is a perspective view that illustrates the discharge valve in accordance with a fourth embodiment of the present invention.

As illustrated, the discharge valve 100 includes a cover 110 coming in contact with a cylinder 10 so as to open and close an inner space of the cylinder, and a valve body 120 formed as one body with the cover 110 and formed of a material different from the cover 110.

The valve body 120 includes a disc portion 122 having a circular plane 121 facing the cylinder 10, and a circular protruding portion 123 extendingly, formed at one surface of the disc portion 122 to have certain thickness and outer diameter.

The cover 110 is formed with a certain thickness over a circular plane 121 of the disc portion 122, its edge and, an outer edge of the opposite side of the circular plane 121.

Preferably, the valve body 120 is formed of nonferrous metal, and the nonferrous metal is aluminum, magnesium or their alloy.

The cover 110 is formed of a plastic material, and the plastic material is polyetheretherketon (PEEK).

The cover 110 is preferably formed by performing coating on the valve body 120.

Figure 5:
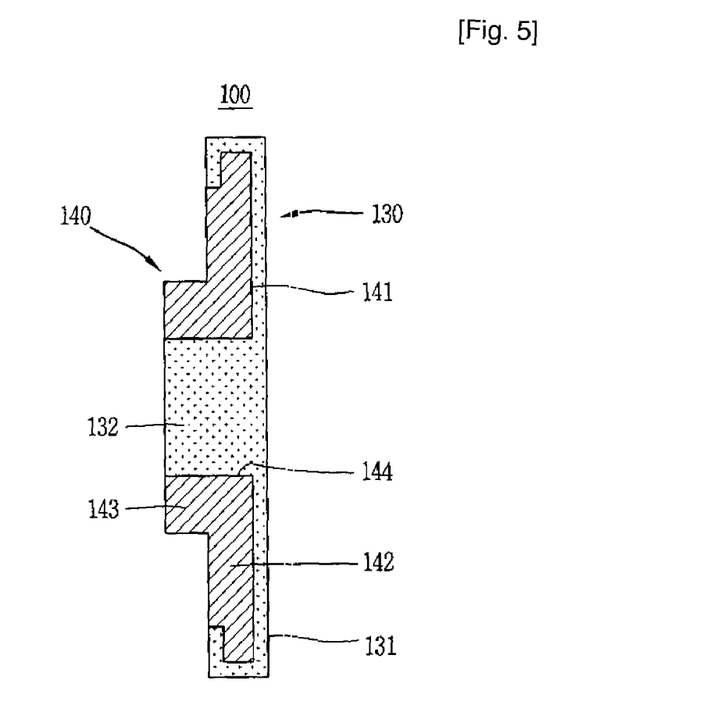
FIGS. 5 and 6 are a sectional view and a perspective view that illustrate a discharge valve in accordance with a second embodiment of the present invention.
Figure 6:
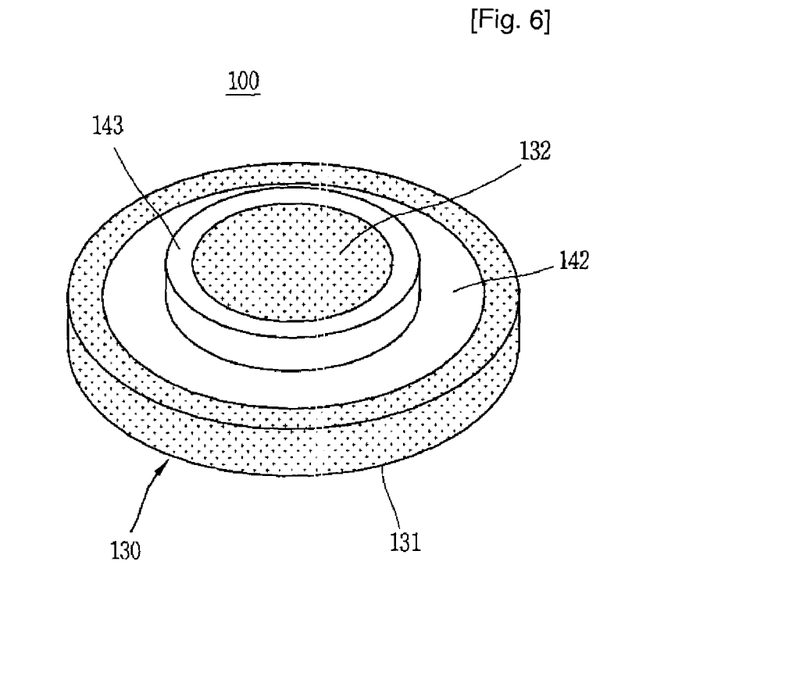

FIG. 5 is a sectional view of a discharge valve in accordance with a second embodiment of the present invention, and FIG. 6 is a perspective view of the discharge valve.

As illustrated, the discharge valve 100 includes a cover 130 coming in contact with the cylinder 10 so as to open and close the inner space of the cylinder 10, and a valve body 140 formed as one body with the first cover 130 and formed of a material different from that of the cover 130.

The valve body 140 includes a disc portion 142 provided with a circular plane 141 facing the cylinder 10, a circular protruding portion 143 extendingly formed at one surface of the disc portion 142 to have certain thickness and outer diameter, and a penetrating hole 144 penetratingly formed at the center of the disc portion 142 and the circular protruding portion 143.

The cover 130 includes a cover portion 131 formed with a certain thickness over the circular plane 141 of the disc portion 142, its edge and an outer edge of the opposite side of the circular plane 141, and a filling. protruding portion 132 extendingly formed at the cover portion 131 and filling the penetrating hole 144 of the valve body.

The valve body 140 is formed of nonferrous metal, and the nonferrous metal is aluminum, magnesium or their alloy.

The cover 130 is formed of a plastic material, and, preferably, the plastic is PEEK.

The cover 130 is formed together with the valve body 140 by inserting molding.

Figure 7:
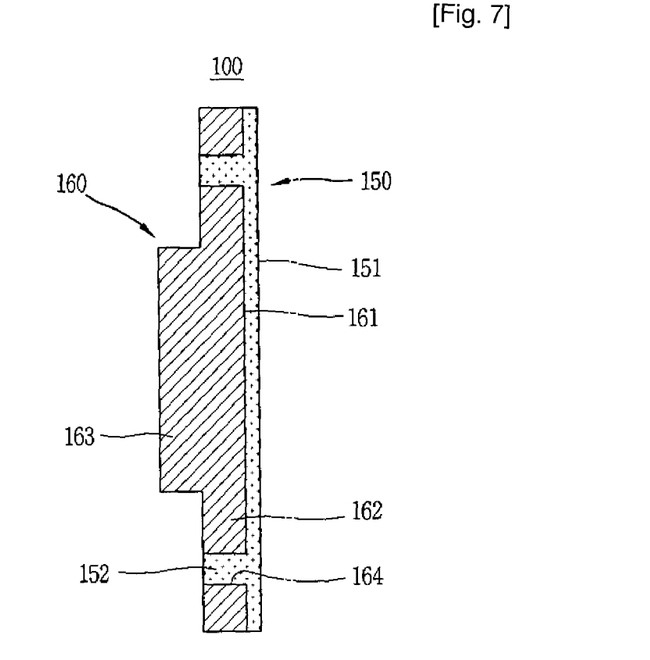
FIGS. 7 and 8 are a sectional view and a perspective view that illustrate a discharge valve in accordance with. a third embodiment of the present invention.
Figure 8:
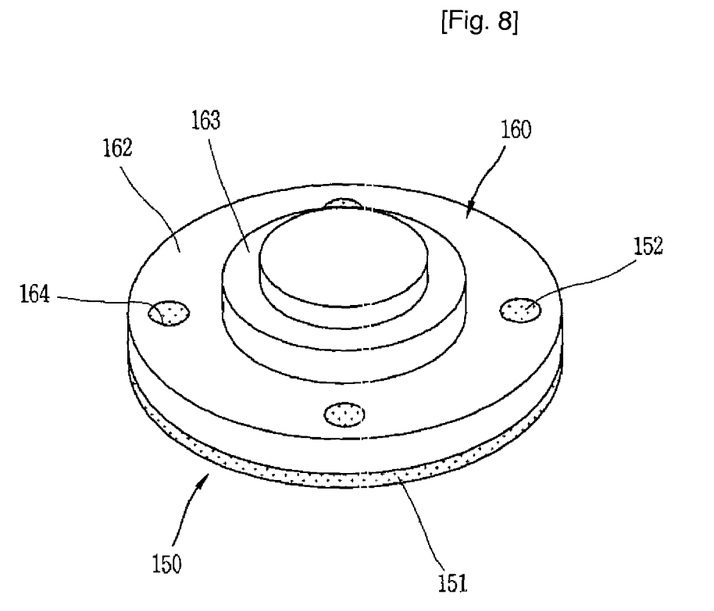

FIG. 7 is a sectional view that illustrates a discharge valve in accordance with a third embodiment of the present invention, and FIG. 8 is a perspective view of the discharge valve.

As illustrated, the discharge valve 100 includes a cover 150 coming in contact with the cylinder 10 so as to open and close an inner space of the cylinder 10, and a valve body 160 formed as one body with the cover 150 and formed of a material different from that of the cover 150.

The valve body 160 includes a disc portion 162 provided with a circular plane 161 facing the cylinder 10, a circular protruding portion 163 extendingly formed at one surface of the disc portion 162 to have certain thickness and outer diameter, and a plurality of penetrating holes 164 penetratingly formed at an edge of the disc portion 162. Preferably, four penetrating holes 164 are formed on the disc portion 162 at a regular interval.

The cover 150 includes a cover portion 151 formed with a certain thickness at the circular plane 161, and a plurality of filling protruding portions 152 extendingly formed at the cover portion 151 and respectively filling the penetrating holes 164 of the valve body, The valve body 160 is formed of nonferrous metal, and the nonferrous metal is aluminum, magnesium or their alloy.

Preferably, the cover 150 is formed of a plastic material, and the plastic is PEEK.

Preferably, the cover 150 is formed by insert-molding with the valve body 160.

Figure 9:
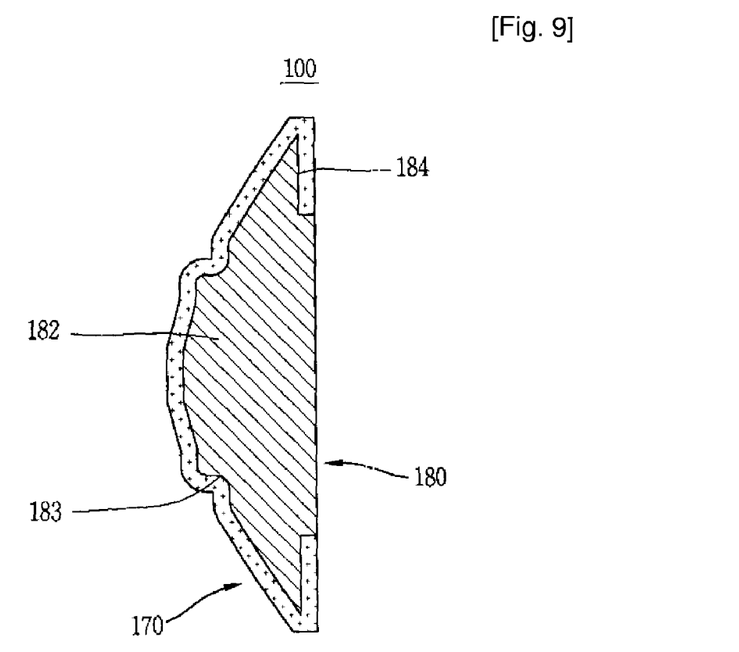
FIG. 9 is a sectional view that illustrates a discharge valve in accordance with a fourth embodiment of the present invention.

FIG. 9 is a sectional view that illustrates a discharge valve in accordance with a fourth embodiment of the present invention.

As illustrated, the discharge valve 100 includes a cover 170 coming in contact with the cylinder 10 so as to open and close an inner space of the cylinder 10, and a valve body 180 formed as one body with the cover 170 and formed of a material different from that of the cover 170.

The valve body 180 includes a body portion 182 provided with a circular plane 181 facing the cylinder 10 and having a hemispherical shape with a predetermined volume, a spring fixing groove 183 formed at the body portion 182 to be placed at the opposite side of the circular plane 181, and an annular groove 184 formed at the edge of the circular plane 181 of the body portion 183, having certain depth and width.

The cover 170 has a constant thickness over the body portion 182 excluding the annular groove 184 and the circular plane 181. The cover portion filled in the annular groove 184 of the valve body comes in contact with the cylinder 10.

Preferably, the surface of the cover portion filled in the annular groove 184 of the valve body 180 is a plane which is the same as the circular plane 181 of the valve body 180.

The valve body 180 is formed of nonferrous metal, and the nonferrous metal is aluminum, magnesium or their alloy.

Preferably, the cover 170 is formed of a plastic material, and the plastic is PEEK.

The cover 170 is preferably formed by performing coating on the valve body 180.

Figure 10:
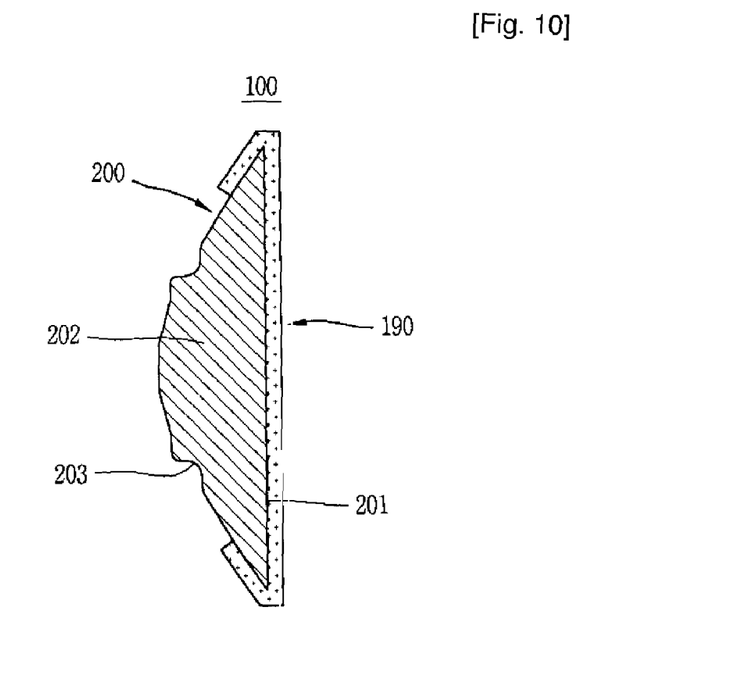
FIG. 10 is a sectional view that illustrates a discharge valve in accordance with a fifth embodiment of the present invention.

FIG. 10 is a sectional view that illustrates a discharge valve in accordance with a fifth embodiment of the present invention.

As illustrated, the discharge valve 100 includes a cover 190 coming in contact with the cylinder 10 so as to open and close an inner space of the cylinder 10, and a valve body 200 formed as one body with the cover 190 and formed of a material different from the cover 190.

The valve body 200 includes a body portion 202 having a circular plane 201 facing the cylinder 10 and having a hemispherical shape with a predetermined volume, and a spring fixing groove 203 formed at the body portion 202 to be placed at the opposite side of the circular plane 201.

The cover 190 has a constant thickness over the circular plane 201 and an edge of the body portion 202.

Preferably, the valve body 200 is formed of nonferrous metal, and the nonferrous metal is aluminum, magnesium or their alloy.

Preferably, the cover 190 is formed of a plastic material, and the plastic is PEEK.

Preferably, the cover is formed by performing coating on the valve body 200.

Figure 11:
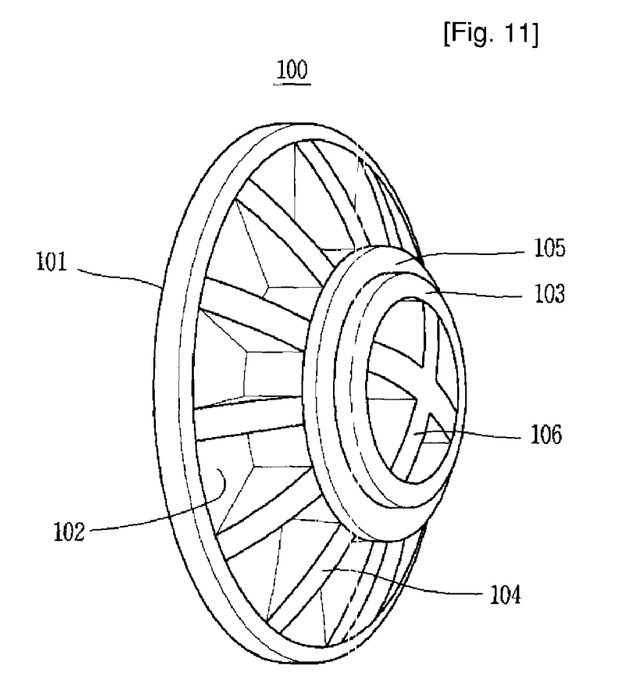
FIG. 11 is a perspective view that illustrates a discharge valve in accordance with a sixth embodiment of the present invention.

FIG. 11 is a sectional view that illustrates a discharge valve in accordance with a sixth embodiment of the present invention.

As illustrated, the discharge valve 100 includes a disc portion 102 having a circular plane 101 facing a cylinder 10 having an inner space, a ring, type protruding portion 103 protrudingly formed to a predetermined height at one side of the disc portion 102, a plurality of first reinforcement ribs having a certain width and formed at the disc portion 102 and an outer surface of the ring type protruding portion 103, and a spring fixing groove 105 formed at the ring type protruding portion 103. Preferably, a second reinforcement rib 106 is formed inside the ring type protruding portion 103.

The discharge valve 100 is made of PEEK.

Specifically explaining a method for manufacturing the discharge valve in accordance with the first to fifth embodiments' of the present invention, aluminum, magnesium or their alloy constituting the valve body is molded into a shape of the valve body by pressing or other methods, the molded valve body is put into a mold, and then inserting molding is performed using PEEK, to thereby form a cover.

In case of the first, fourth and fifth embodiments of the discharge valve, aluminum, magnesium or their alloy constituting the valve body is molded into a shape of the valve body by pressing or other methods, and the surface of the molded body is coated with PEEK to thereby form a cover.

Figure 12:
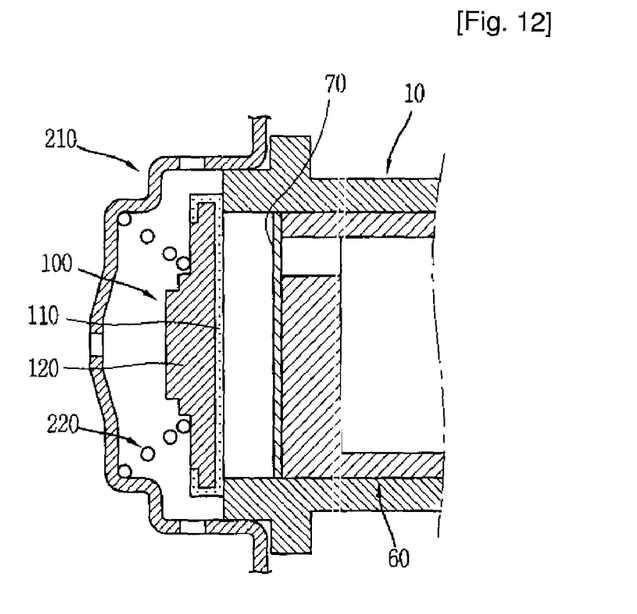
FIG. 12 is a sectional view that illustrates a discharge valve assembly of a reciprocating compressor in accordance with the present invention.

Preferably, in case of the discharge valve in accordance with the sixth embodiment, the PEEK is molded in a mold FIG. 12 is a sectional view that illustrates a discharge valve assembly of the reciprocating compressor in accordance with the present invention, and the same reference numerals are designated to the same parts.

As illustrated, the discharge valve assembly of the reciprocating compressor, includes a discharge cover 210 for covering an inner space of the cylinder 10; a discharge valve 100 including a plastic cover 110 coming in contact with the cylinder 10 and a valve body 120 formed of nonferrous metal as one body with the plastic cover 110, for opening closing the inner space of the cylinder 10 as its cover comes in contact with the cylinder 10; and a spring 220 placed between the inside of the discharge cover 210 and the discharge valve 100 and elastically supporting the discharge valve 100.

Preferably, the valve body 120 is formed of aluminum, magnesium or their alloy of the nonferrous metal.

Preferably, the cover 110 is formed of PEEK.

Preferably, the cover 110 is formed by performing coating on the valve body 120.

Undescribed reference numeral 60 is a piston, and 70 is an intake valve.

As the discharge valve 100, all of the discharge valves according to the first to sixth embodiments which have already been described above can be used.

In case of the discharge valves according to the first to third embodiments, one side of the spring 220 is fixedly supported by the circular protruding portion 123, 143 and 163 and the disc portion 122, 142 and 162. Also, in case of the discharge valves according to the fourth to sixth embodiments, one side of the spring 220 is fixedly supported by the spring fixing groove 183, 203 and 105.

The operation effect of a discharge valve and a discharge valve assembly of a reciprocating compressor having the same according to the present invention will now be described.

As for the discharge valve 100 in accordance with the present invention, the valve body has a predetermined volume and is made of nonferrous metal such as aluminum, magnesium or the like. Also, a cover formed to encompass the valve body is formed of an engineering plastic material, particularly, PEEK, and comes in contact with a cylinder when the inner space of the cylinder is opened or closed.

Accordingly, a volume of the valve body increases, thereby improving structural strength, and even though the volume of the valve body increases, its weight becomes relatively small. Also, because the cover encompassing a portion of the valve body and coming in contact with the cylinder is formed of plastic, particularly, PEEK, abrasion becomes small even if the cover comes in contact with the cylinder when the discharge valve opens and closes the inner space of the cylinder.

The PEEK has heat resistance from 150 to 300° C., and also has excellent fatigue resistance and abrasion resistance.

The discharge valve 100 in accordance with the present invention has improved structural strength because the valve body and the cover are integrally formed such that the cover covers the valve body or the cover covers the valve body while one portion of the cover is inserted in the valve body.

Because the discharge valve 100 of the present invention has great structure strength, deformation can be prevented due to pressure when the discharge valve 100 opens or closes the inner space of the cylinder.

Also, the valve body of the discharge valve of the present invention employs cheap nonferrous metal, particularly, aluminum or magnesium and the cover employs a plastic material, particularly, PEEK, which contributes to reducing a manufacturing cost.

In the discharge valve assembly of the reciprocating compressor according to the present invention, a piston 60 linearly reciprocates within an inner space of a cylinder 10 upon receiving a linearly-reciprocating driving force of a driving motor (not shown). Also, a discharge valve 100 moves according to a pressure difference within the inner space of the cylinder due to the reciprocation of the piston 60, thereby opening or closing the inner space of the cylinder 10. The discharge valve 100 is elastically supported by the spring 220, and opens and closes the inner space of the cylinder 10 by contacting with an end surface of the cylinder 10, namely, a contact surface. Here, a cover 110 of the discharge valve 100 comes in contact with the contact surface.

Because the discharge valve 100 has the aforedescribed characteristics,. its structural strength is reinforced, and its weight and manufacturing cost are reduced.

As described so far, the discharge valve according to the present invention has a small weight, the great structural strength and abrasion resistance. Thusly, deformation due to the pressure during operation, as well as abrasion and damage to constituents, can be prevented. Accordingly, leakage of a compression gas is prevented during the operation of the compressor, thereby improving compression efficiency and elongating a lifespan of a product. Thusly the reliability is improved.

Also, the present invention has an effect of increasing competitiveness of a product by reducing a manufacturing cost of the discharge valve.

As the present invention may be embodied in several forms. without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A discharge valve comprising:
    a disc portion provided with a circular plane facing a cylinder having an inner space;
    a ring type protruding portion protrudingly formed to a predetermined height at one surface of the disc portion and having a space inside thereof;
    a plurality of first reinforcement ribs having a certain width and formed at outer surfaces of the disc portion and the ring type protruding portion;
    a plurality of second reinforcement ribs formed to extend between an inner wall of the ring type protruding portion by which the ring type protruding portion is reinforced in both of a lateral direction and a vertical direction and
    a spring fixing groove formed at the ring type protruding portion.

2. The discharge valve of claim 1, wherein the plurality of second reinforcement ribs intersect each other inside of the ring type protruding portion.

3. The discharge valve of claim 1, wherein the plurality of second reinforcement ribs extend in a radial direction of the ring type protruding portion.

4. The discharge valve of claim 1, wherein the discharge valve is formed of polyetheretherketon.

\* \* \* \* \*